March 10, 1931.  P. C. A. VAN DER MEER  1,796,068
CASTER
Filed Dec. 31, 1929  3 Sheets-Sheet 1
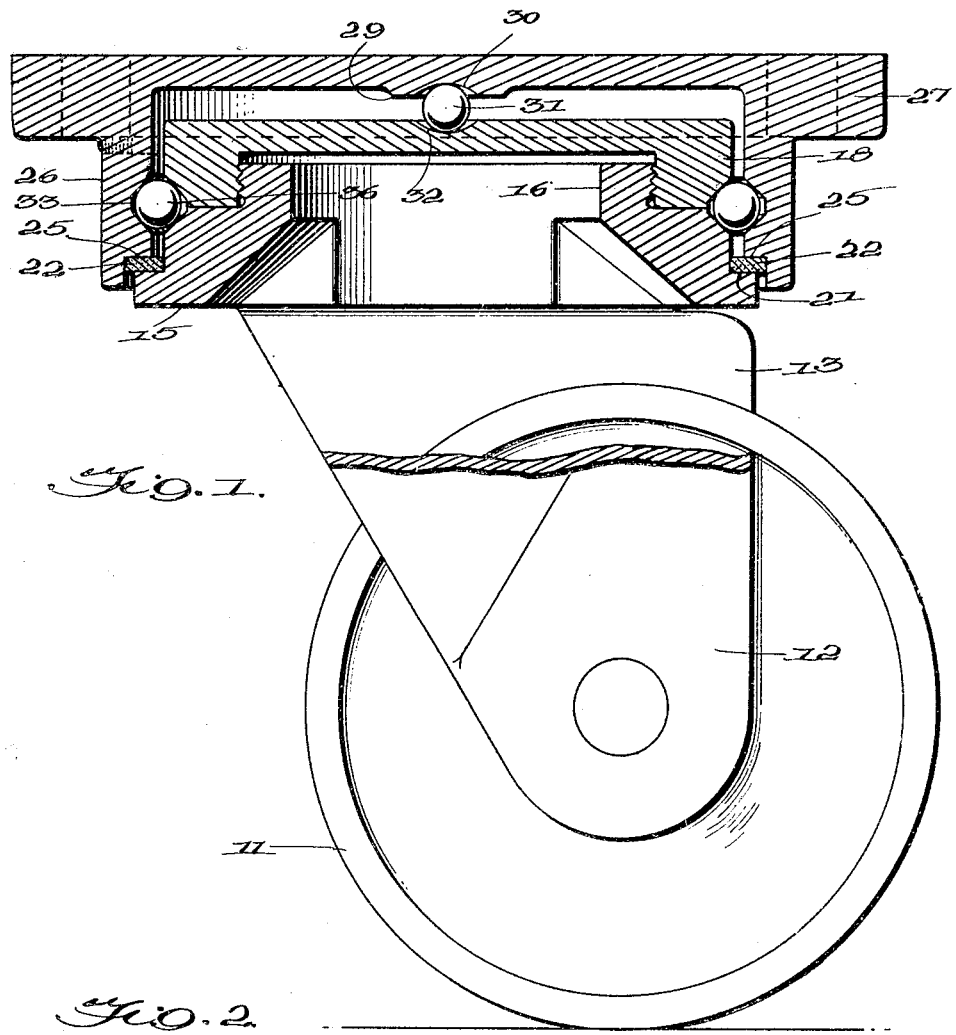
Fig. 1.
Fig. 2.
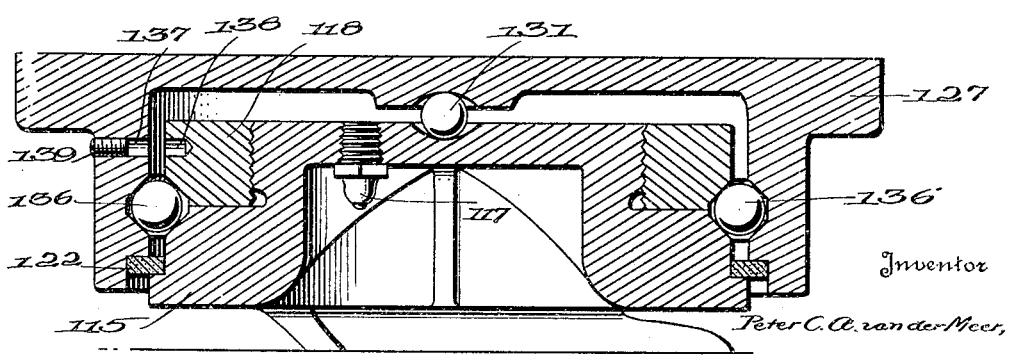
Inventor
Peter C. A. van der Meer,
By Hazell + Leech
Attorneys March 10, 1931.  P. C. A. VAN DER MEER  1,796,068
CASTER
Filed Dec. 31, 1929  3 Sheets-Sheet 2
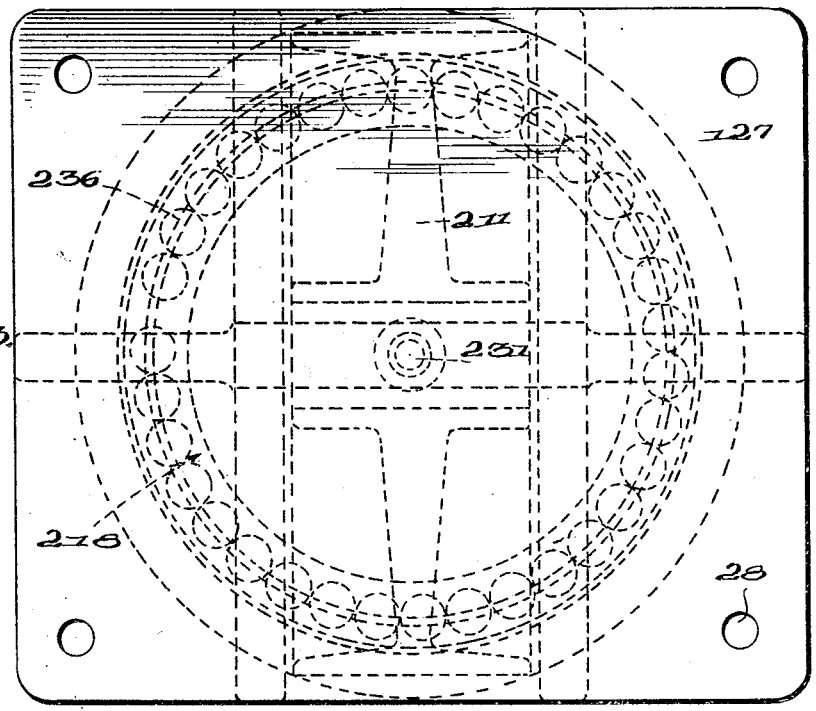
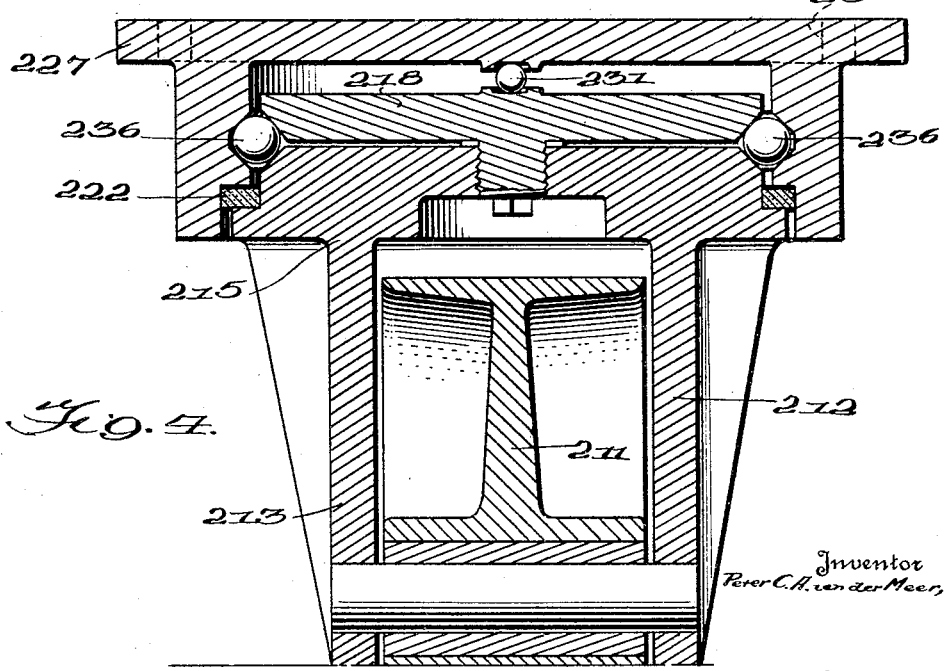
Inventor
Peter C. A. van der Meer,
By Hazell & Leech
Attorneys Inventor
Peter C. A. van der Meer,
By Hazell & Leech
Attorneys Patented Mar. 10, 1931

1,796,068

UNITED STATES PATENT OFFICE

PETER C. A. VAN DER MEER, OF DETROIT, MICHIGAN, ASSIGNOR, BY DIRECT AND MESNE ASSIGNMENTS, TO TRANSUE AND WILLIAMS STEEL FORGING CORPORATION, OF WILMINGTON, DELAWARE, A CORPORATION OF DELAWARE

CASTER

Application filed December 31, 1929. Serial No. 417,804.

The present invention relates to casters and especially to a type of caster particularly adapted to support heavy movable bodies.

It is an object of the present invention to provide a caster of extremely rugged construction and great strength without being bulky.

A further object is to provide a caster having antifriction bearings arranged for the greatest efficiency in use and also in assembling the caster.

A still further object is to provide an improved caster of this type having adequate sealing means by which the antifriction bearing is adequately protected against the effects of any acid or other fumes which may exist in the atmosphere where the caster is used.

Other objects and advantages of the invention will appear from the following description, taken in connection with the accompanying drawings, which illustrate, by way of example, a preferred embodiment of the invention, and in which:

Fig. 1 is a side elevation, partly in section, illustrating a caster embodying the present invention;

Fig. 2 is a fragmentary sectional elevation of the upper portion of a caster embodying the present invention and showing a slightly different construction of the inner bearing;

Fig. 3 is a top plan view showing the top plate of the caster illustrated in Fig. 4;

Fig. 4 is a sectional elevation of the upper portion of a caster embodying the present invention and showing a modified form of inner bearing construction;

Figure 5:
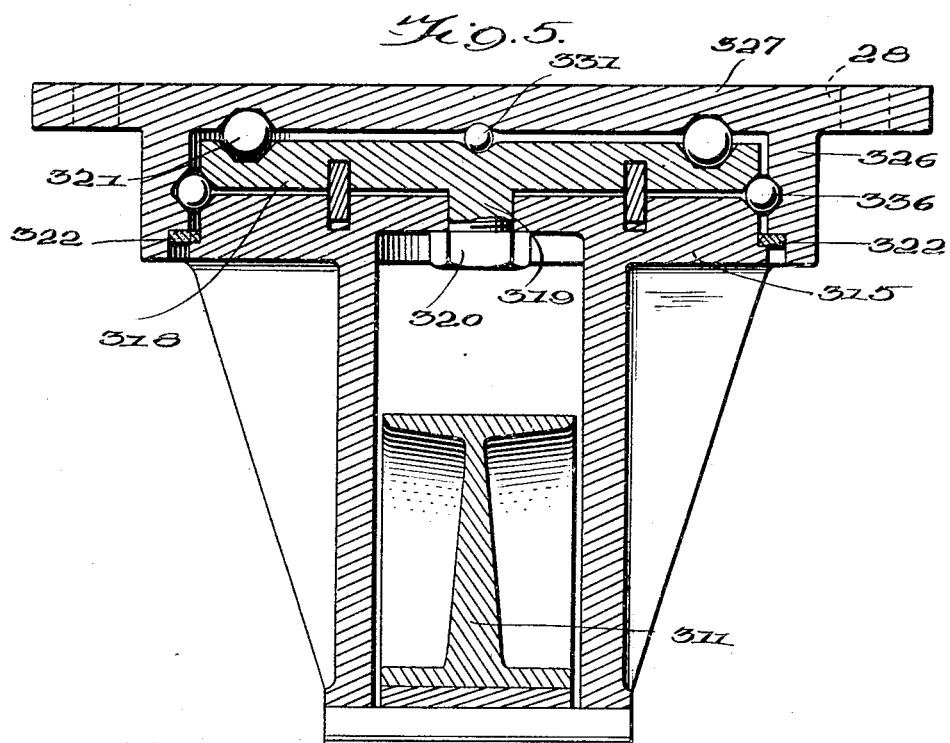
Figs. 5 and 6 are similar sectional elevations of the upper portions of casters illustrating different forms of inner bearings.

Referring in detail to the drawings and particularly to Fig. 1, a caster wheel 11 is mounted on a spindle to rotate between the two substantially parallel side plates 12 and 13 of a wheel-carrying member 15. The member 15 is formed with an annular flange 16, which is externally threaded for cooperation with a threaded bearing plate 18. An inner raceway for a ball race is formed partly on the member 15 and partly on the bearing plate 18 and is in the present instance illustrated as consisting of two adjacent conical surfaces, one formed on the member 15 and the other on the bearing plate 18.

The wheel-carrying member 15 is also formed with a shoulder 21, on which is adapted to rest a sealing washer 22, which is of the proper thickness to contact at all times with the wheel-carrying member 15 and also with a shoulder 25 formed interiorly of the depending annular flange 26 of the caster attaching plate 27, which attaching plate is provided with a plurality of openings shown in dotted lines for the reception of means for attaching the caster as a whole to a movable object.

The under side of the attaching plate 27 is formed centrally with a raised portion 29, in which is located a depression 30, which forms the upper bearing of a center ball 31. A cooperating lower bearing 32 is formed as a central depression in the upper surface of the bearing plate 18, and these cooperating depressions are preferably formed as spherical surfaces of equal radii greater than the radius of the ball 31.

Interiorly of the depending flange 26 of the attaching plate 27 is formed a radial depression 33 constituting an outer ball race cooperating with the inner ball race formed partly on the wheel-carrying member 15 and partly on the bearing plate 18, already described. A circular series of antifriction balls 36 is located in these raceways, as shown in Fig. 1, and it will be observed that each ball of the series has a four-point contact, since it bears at one point on the wheel-carrying member, at one point on the bearing plate, and at two opposite points on the opposite conical surfaces forming the raceway in the attaching plate 27. These balls are preferably not separated from each other by any spacing means, but form a substantially continuous series, enough space being allowed for their efficient and easy operation.

The caster above described is preferably assembled in inverted position, the center ball 31 being first placed in its depression in the attaching plate, after which the bearing plate 18 is placed within the annular flange 26 so that it rests upon the ball 31. At this point a temporary holding pin may be inserted through the opening (see 137, Fig. 2), which extends through the flange 26, so that the inner end of the pin enters a corresponding and aligned depression formed in this instance in the bearing plate 18. See for example Fig. 2. In this position the pin will hold the bearing plate 18 steady in its proper plane so that the bearing balls 36 may be placed in their raceway. Thereupon the sealing washer 25 may be placed in position, and the caster carrier 15 threaded into bearing contact with the balls 36 by its threaded engagement with the bearing plate 18, which latter is held against any rotary movement during this assembly by the pin 37. This pin may now be removed, and the pin opening in the flange 26 may be plugged or otherwise sealed.

The construction just described provides an antifriction caster which may be constructed with small bulk, but is nevertheless capable of carrying a great load. Should any wear occur, it can be taken up by threading the wheel-carrying member further into the bearing plate 18. The more the wheel-carrying member 15 is threaded into the bearing plate 18, the closer together are the side walls of the inner raceway, until finally, when all the wear possible has been compensated for in this manner, the relation of the plate 18 and wheel-carrying member 15 will be as shown in Fig. 1. The construction also is one which can be used in the presence of acid or other deleterious fumes without in any way adversely affecting the antifriction bearing.

Referring now particularly to Fig. 2, the attaching plate 127 is constructed as already described in connection with the plate 27, Fig. 1. The wheel-carrying member 115 in Fig. 2, however, serves as the lower bearing for the center ball 131 and is provided with a lubricating nipple 117, by means of which lubricant is forced to the bearing balls 131 and 136.

The wheel-carrying member 115 in the present instance is threaded into a ring 118, which is held in position during assembling by a temporary assembly pin inserted through the opening 137 and in engagement with the depression 138 of the ring 118, the pin being removed and the plug 139 being inserted to close the opening 137 after the assembly is complete. The sealing washer 122 protects the bearings in the manner already described.

Referring now to Figs. 3 and 4, the center bearing ball 231 is being shown as located in depressions having flat bottoms and formed respectively in the under side of the attaching plate 227 and in the top face of the bearing plate 218. In this instance the bearing plate 218 is provided with a downwardly extending threaded projection formed at its bottom with a squared head or other gripping means by which it may be retained against rotation when the wheel-carrying member 215 is threaded thereupon.

In Fig. 5 a center bearing ball 331 is provided between the attaching plate 327 and the bearing plate 318, as before. In this instance a pair of pins engaging both the bearing plate and the caster-carrying member 315 prevent rotation of the bearing plate during assembly of the wheel-carrying member. The bearing plate 318 is provided with a downwardly extending projection 319, which extends through the top portion of the wheel-carrying member 315 and is threaded for the reception of a nut 320, by which the bearing plate 318 and the wheel-carrying member 315 are secured together.

In this example of the invention, the under side of the attaching plate 327 and the upper face of the bearing plate 318 are provided with opposed circularly arranged ball raceway depressions the sides of which are conical for the reception of a circular series of bearing balls 321. The plane containing the centers of the bearing balls 321 is the same plane which contains the center bearing ball 331.

Figure 6:
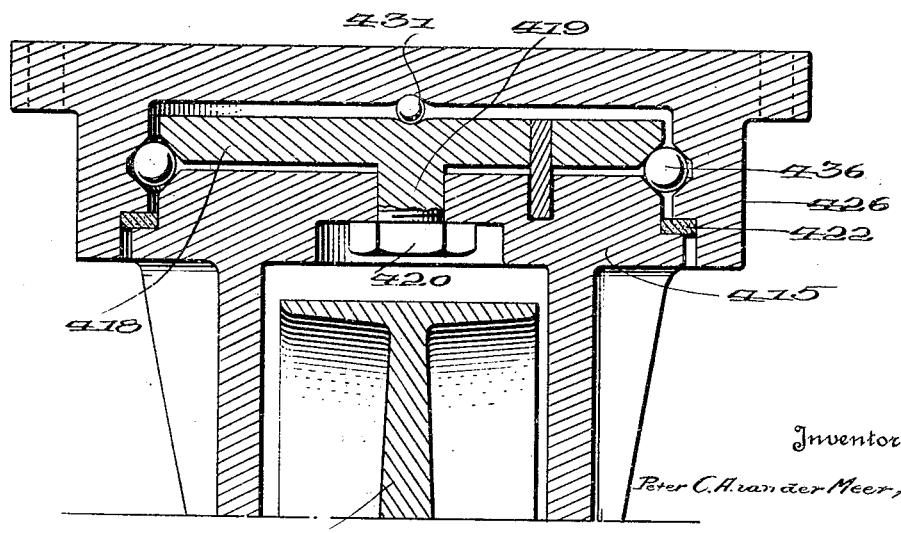

Fig. 6 illustrates a construction similar to that described in Fig. 5, except that the circular series of bearing balls in the upper face of the bearing plate 418 has been omitted. In each case the sealing washer 422 is employed to seal the bearings not only against dust, but also against acid or other fumes.

While several constructions have been shown in the drawings, all of which illustrate embodiments of the invention, it will be evident that further variations may be embodied without departing from the invention as defined by the following claims.

What is claimed is:

1. A caster comprising an attaching plate and a wheel-carrying assembly, a bearing ball located centrally between the two, and a circular series of bearing balls cooperating with said plate and said assembly and preventing their separation.

2. A caster including an attaching plate and a wheel-carrying assembly, a bearing ball therebetween, said wheel-carrying assembly being located partly within said plate, a circular series of balls spacing said assembly from said plate laterally and a second circular series of balls spacing said assembly from said plate vertically.

3. A caster including an attaching plate and a wheel assembly, a bearing ball therebetween, said wheel assembly being located partly within said plate, a circular series of balls spacing said assembly from said plate laterally, a second circular series of balls spacing said assembly from said plate vertically, said plate and said assembly being formed with cooperating raceways for both of said series, the sides of said raceways being formed as the surfaces of cones having their apices located in a single straight line passing through said bearing ball.

In testimony whereof, I affix my signature.

PETER C. A. VAN DER MEER.